(12) United States Patent
Hackmann

(10) Patent No.: US 10,977,887 B2
(45) Date of Patent: Apr. 13, 2021

(54) VOTING METHOD

(71) Applicant: regio iT gesellschaft fuer informationstechnologie mbh, Aachen (DE)

(72) Inventor: Hendrik Hackmann, Aachen (DE)

(73) Assignee: regio IT gesellschaft fuer informationstechnologle mbh, Aachen (DE)

( * ) Notice: Subject to any disclaimer, the term of this patent is extended or adjusted under 35 U.S.C. 154(b) by 0 days.

(21) Appl. No.: 16/386,791

(22) Filed: Apr. 17, 2019

(65) Prior Publication Data

US 2019/0325684 A1 Oct. 24, 2019

(30) Foreign Application Priority Data

Apr. 24, 2018 (DE) .......................... 102018109825.1

(51) Int. Cl.
*G07C 13/00* (2006.01)
*H04L 9/06* (2006.01)

(52) U.S. Cl.
CPC ............ *G07C 13/00* (2013.01); *H04L 9/0637* (2013.01); *H04L 9/0643* (2013.01); *H04L 2209/38* (2013.01); *H04L 2209/463* (2013.01)

(58) Field of Classification Search
CPC ............................ G06Q 2230/00; G07C 13/00
USPC ...................... 235/386, 375, 487, 51; 705/12
See application file for complete search history.

(56) References Cited

U.S. PATENT DOCUMENTS

| 7,657,452 | B2 | 2/2010 | Pandit | |
|---|---|---|---|---|
| 2002/0077887 | A1 | 6/2002 | Shrader | |
| 2005/0269406 | A1* | 12/2005 | Neff | G07C 13/00 235/386 |
| 2005/0284935 | A1* | 12/2005 | Sinha | G07C 13/00 235/386 |
| 2017/0061398 | A1 | 3/2017 | Joseph | |
| 2017/0109955 | A1 | 4/2017 | Ernest et al. | |
| 2017/0221052 | A1 | 8/2017 | Sheng et al. | |
| 2017/0352219 | A1 | 12/2017 | Spanos | |
| 2019/0088063 | A1* | 3/2019 | Unagami | G07C 13/00 |
| 2019/0158272 | A1* | 5/2019 | Chopra | H04L 9/0637 |
| 2019/0213820 | A1* | 7/2019 | Sebes | G07C 13/00 |
| 2019/0288846 | A1* | 9/2019 | Zawierka | H04L 9/3239 |

FOREIGN PATENT DOCUMENTS

| CN | 102568074 B | 7/2012 |
|---|---|---|
| CN | 107146318 A | 9/2017 |
| CN | 107294727 A | 10/2017 |

(Continued)

*Primary Examiner* — Edwyn Labaze
(74) *Attorney, Agent, or Firm* — Von Rohrscheidt Patents

(57) ABSTRACT

A voting method, comprising the steps: a person casting a vote at a voting machine, wherein the voting machine includes a voter list that includes a first record in which the person is registered, wherein the voting machine includes a vote list that is separate from the voter list and a reference list that is separate from the voter list and from the vote list; the voting machine generating a second record in the vote list and recording the vote in the second record; the voting machine computing a hash value of the second record with the vote in the vote list to form a reference; and the voting machine generating a third record in the reference list and recording the reference into the record in the reference list.

16 Claims, 1 Drawing Sheet

(56) References Cited

FOREIGN PATENT DOCUMENTS

| DE | 102006039662 B4 | 4/2008 |
|----|-----------------|--------|
| DE | 102009001362 A1 | 9/2010 |
| JP | 4235453 B2 | 8/2005 |
| KR | 101837169 B1 | 3/2018 |
| WO | WO2017145005 | 8/2017 |

\* cited by examiner

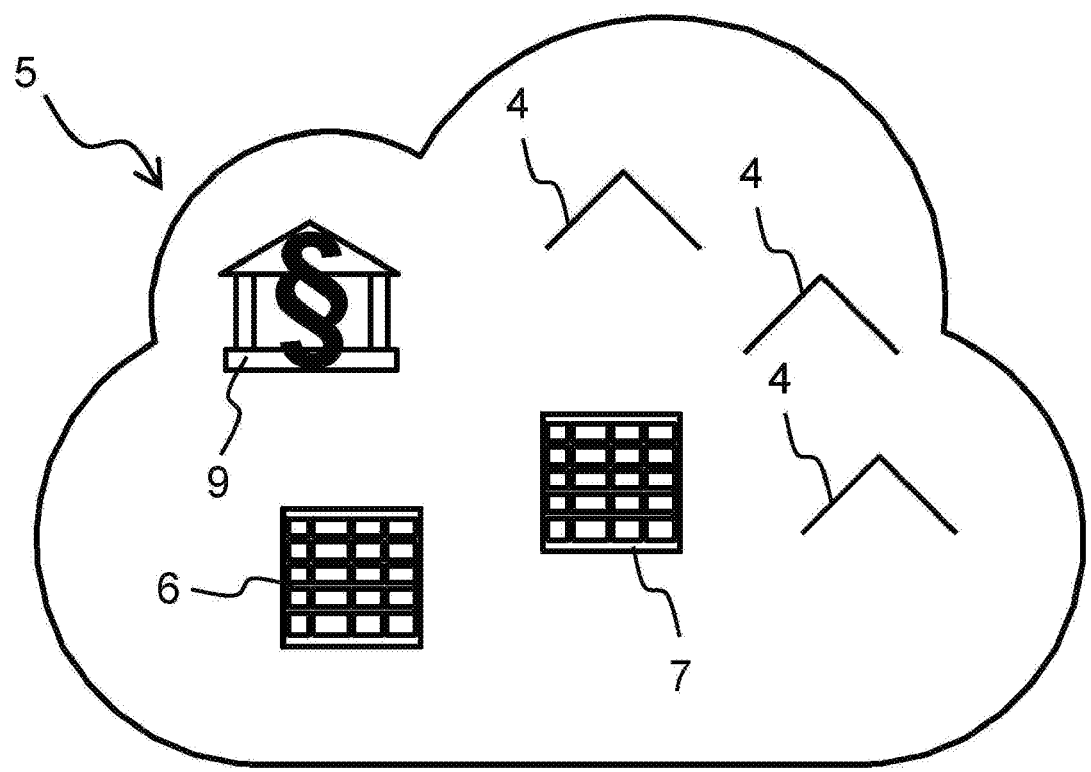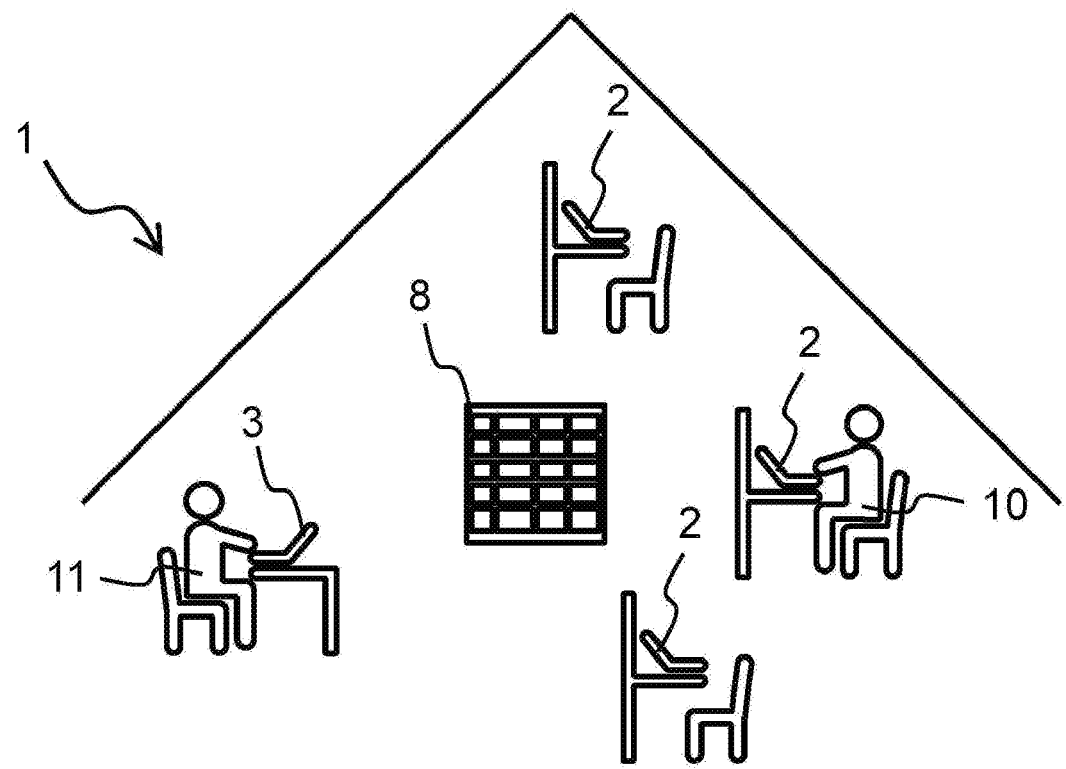

VOTING METHOD

RELATED APPLICATIONS

This application claims priority from and incorporates by reference German patent application DE 10 2018 109 825.1 filed on Apr. 24, 2018.

FIELD OF THE INVENTION

The invention relates to a voting method.

BACKGROUND OF THE INVENTION

DE10 2007 014 075 A1 discloses a voting method of the generic type recited supra with a reference list that can be represented by a matrix. A person that has cast a vote can have the vote displayed again through a position in the matrix that is only known to the person and through the reference to the vote list recorded in the matrix so that the person can check whether the registered vote coincides with a memory of the person.

Proving a subsequent alteration of the vote recorded in the vote list to third persons requires an alternative proof of a correctness of the memory of the person in the known method.

DE 10 2009 001 362 A1 proposes a confirmation function for a voting machine for the voting method of the generic type recited supra which enables the person to check whether the cast vote was recorded correctly. The confirmation function, however, contradicts the stipulation of article 38 (1) of the German constitutional code which requires nonexistence of any confirmation for German parliamentary elections. This means the voter must not be able to prove to third parties how he or she has voted.

Block chains are generally known in the art, e.g. from Drescher, Daniel: Blockchain Grundlagen, Frechen 2017 and their application in voting methods are known from US 2017/352219 A1, US 2017/109955 A1, KR 101837169 B1, CN 107294727 A, WO 2017/145005, CN 107146318 A, US 2017/0061398 A1 and US 2017/0221052 A1. Other voting methods with encrypted databases are known from JP 4235453 B2, CN 102568074 B, US 2002/0077887 A1, DE 10 2006 039662 B4 and U.S. Pat. No. 7,657,452 B2.

BRIEF SUMMARY OF THE INVENTION

Thus, it is an object of the invention to provide a proof of a subsequent alteration of a cast vote.

The object is achieved by a voting method, comprising the steps: a person casting a vote at a voting machine, wherein the voting machine includes a voter list that includes a first record in which the person is registered, wherein the voting machine includes a vote list that is separate from the voter list and a reference list that is separate from the voter list and from the vote list; the voting machine generating a second record in the vote list and recording the vote in the second record; the voting machine computing a hash value of the second record with the vote in the vote list to form a reference; and the voting machine generating a third record in the reference list and recording the reference into the record in the reference list.

Improving upon the known voting method it is proposed according to the invention that the voting machine determines a hash value of the record in the vote list as a reference. Using the hash value for subsequently calling up the record requires a checking of all records of the vote list until a record is found that corresponds to the hash value. Since the hash value of the record changes when the record in the vote list is subsequently altered the hash value is not found during the examination of all records. Not being able to find a cast vote in the vote list proves by reverse conclusion that the vote has been subsequently altered.

The voting machine advantageously determines a hash value of a record in the voter list and records the hash value with the reference in the reference list in an advantageous method according to the invention. Not being able to find a record of a person in the voter list is proof that the record has subsequently altered. By associating with the reference to the cast vote the person can assure that he or she actually sees the vote actually cast by him or her and not a random vote cast by another person when performing a subsequent check.

Advantageously the person selects a password when performing the method according to the invention and the voting machine encrypts the record in the reference list using the password. Since the password is required for decryption and the password is only known to the person himself or herself third parties cannot access the record in the reference list and can therefore not determine the associated vote that is recorded in the vote list.

Advantageously the person is initially recorded in the voter list when performing the method according to the invention and identified based on the record in the voter list before the vote is cast. The identification based on the voter list prevents third parties from casting the vote.

Advantageously it is being recorded in the record in the voter list according to a method according to the invention when the person has cast the vote. The record prevents a casting of multiple votes.

Advantageously the voter list and/or the reference list are destroyed before evaluating the vote list according to the method according to the invention. By destroying the voter list and/or the reference list or both lists checking for a correct recording of the vote is limited to the time period until the vote list is evaluated. By destroying the reference list decrypting records in this list after this time period is prevented. Both measures reduce a risk of unauthorized access to information which person has voted which way.

Advantageously the voter list, the vote list and/or the reference list are data bases, in particular distributed data bases, in particular synchronized data bases, in particular block chains. Using data bases facilitates electronic processing of large volumes of data. Distributed an in particular synchronized data bases that are provided in several instances identically reduce the risk of data loss. Block chains furthermore provide a high degree of safety against unauthorized alterations.

Depending on requirements with respect to safety against data loss and unauthorized alteration of a voting method all three lists can be block chains or only the reference list or the vote list can be block chains and the vote list can be a less complex data base.

Advantageously group of voting machines is configured for the person to cast his or her vote wherein the voter list and the vote list are synchronized on the voting machines of the group. The synchronization between the voting machines prevents multiple votes from being cast by the person and thus reduces a risk of data loss.

When the reference list between the voting machines of the group is synchronized as well, the person can check a correct recording of the cast vote at all voting machines of the group.

Advantageously the voting machine issues a machine encryption and encrypts the record in the vote list using the machine encryption when performing the method according to the invention. Since the machine encryption is required for performing this decryption and the machine encryption is only known at the respective voting machine the person can only access the record in the vote list at this particular voting machine and determine the recording of the vote at the voting machine where the vote has been cast.

Advantageously the votes cast on the voting machines are initially collected in blocks and the blocks are recorded in the vote list when performing the method according to the invention. The record in the voter list that indicates that a person has voted thus receives a different time stamp than the record of the vote of the person in the vote list. Thus, both records cannot be associated with each other using the time stamp. The three preceding measures recited supra thus respectively reduce a risk of subsequent unauthorized access to information which person has voted which way.

A voting machine is furthermore proposed according to the invention that tis configured to perform the voting method according to the invention.

Advantageously a voting station with a plurality of voting machines according to the invention includes a monitoring device that checks the voting machines for alterations and that is being checked by the voting machines for alterations. This mutual checking prevents an undetected and unauthorized alteration of the voting machine.

Last not least a software program product is proposed according to the invention configured to set up a universal computer as the voting machine according to the invention.

BRIEF DESCRIPTION OF THE DRAWINGS

The drawing FIGURE illustrates a schematic diagram of the method according to the invention.

DETAILED DESCRIPTION OF THE INVENTION

The invention is subsequently described based on an embodiment. The voting station 1 according to the invention that is illustrated in the drawing FIGURE includes a plurality of voting machines 2 according to the invention and a monitoring device 3.

The voting machines 2 and the monitoring device 3 are universal computers (PCs) that are configured by a software program product according to the invention to perform the voting method according to the invention. The voting machines 2 are networked with each other and with the monitoring device 3 and with additional non-illustrated voting machines 2 in other voting stations 4 through a cloud 5.

A respective voter list 6, a vote list 7 and a reference list 8 are implemented on the voting machines 2 as three different private block chains that are completely decoupled from each other and include a permission control (private permissioned block chains) which have different service lives and that reference each other. The voter list 6 and the vote list 7 is synchronized in all voting machines 2 in the cloud 5, the reference list 8 of the voting station 1, 4 is only synchronized in the voting machines arranged at the voting locations 1, 4. All voting machines 2 are authorized to complement the voter lists 6, the vote lists 7 and the reference lists 8 stored in the respective voting machines 2.

In order to prepare a vote according to the voting method according to the invention the voter list 6 is initially generated by a non-illustrated central registration agency 9. For each person 10 that is authorized to participate in the vote a hash reference regarding personal data (identifier in the voter register, registration agency 9, voting district) and a PIN that is issued by the registration agency 9 is recorded in the voter list 6. Furthermore TANs are generated and simultaneously stored in the voter list 6 as a hash reference. The PIN and one of the TANs are separately communicated to the person's 9 authorized to participate in the election. All voting machines 2 have reading access and writing access to the voter list 6 and to the vote list 7 that is initially empty.

At each voting station 1, 4 the voting machines 2 are started by a voting manager and networked with the monitoring device 3. The voting machines 2 and the monitoring device 3 determine a hash value of a source code of a respectively installed system in uniform intervals and mutually communicate these values to one another. If the hash value of a voting machine changes during the election the voting machine is automatically shut down. If the hash value of the voting machine 3 changes the respective voting station is shut down.

The respective valid source code of the system of the voting machines 2 is public and identical in all voting machines 2, the hash value becomes visible to the public during the election and is displayed on the monitoring device 3.

A person 10 that is authorized to vote logs into one of the voting machines 2 with his or her personal data and the PIN. When the hash reference regarding the recorded data coincides with a value in the voter list 6 access is granted.

The person 10 uses his or her TAN to cast his or her vote. The voting machine searches for a block including the hash reference of the person 10 and the hash value of the TAN in the voter list 6. When a block of this type is missing the voting machine generates this block and grants access for casting the vote. If the block already exists then the vote was already stored and renewed access to cast the vote is denied.

When the voting person 10 casts his or her vote he or she enters a personal password. The voting machine stores the cast vote, the voting precinct and the voting region in the vote list 7 in a preliminary manner and stores a hash value generated from the hash references of the person 10 and of the cast vote in the reference list 8 and encrypts the record in the reference list with the password and encrypts the record in the vote list 7 with a device key of the voting machine. After a predetermined time period the votes that are stored by all voting machines 2 in a preliminary manner are stored as a block in the vote list 7.

In order to check his or her vote any person 10 authorized to vote can log into the voting machine again with his or her personal data and the PIN and can enter the personal password that is only known to the person. The voting machine initially attempts to sequentially decipher the entries in the reference list using the password. If this is successful for a record the voting machine reads the hash values of the vote and of the person 10 and initially checks the voter list for a record, then sequentially decrypts each of the cast votes in the vote list 7 using its machine key, determines the hash value of each cast vote and shows the vote when the hash value matches a block that is stored in the reference list 8.

After completion of the election the voter list 6 and the reference list 8 are deleted on all voting machines 2 and the vote lists 7 are transmitted to the election agency. Only the election authority has the machine key and can use the machine key to decrypt in the vote list 7.

REFERENCE NUMERALS AND DESIGNATIONS

1 voting station
2 voting machine
3 monitoring device
4 additional voting station
5 cloud
6 voter list
7 vote list
8 reference list
9 registration agency
10 person
11 vote manager

What is claimed is:

1. A voting method, comprising the steps:
a person casting a vote at a voting machine,
wherein the voting machine includes a voter list that includes a first record in which the person is registered,
wherein the voting machine includes a vote list that is separate from the voter list and a reference list that is separate from the voter list and from the vote list;
the voting machine generating a second record in the vote list and recording the vote in the second record;
the voting machine computing a hash value of the second record with the vote in the vote list to form a reference;
the voting machine generating a third record in the reference list and recording the reference in the record in the reference list; and
wherein the voter list, the vote list or the reference list is a blockchain.

2. The voting method according to claim 1, further comprising the steps:
the voting machine determining a hash value of the first record in the voter list, and
the voting machine recording the hash value of the first record in the voter list with the reference in the third record in the reference list.

3. The voting method according to claim 1, further comprising the steps:
the person issuing a password; and
the voting machine encrypting the third record in the reference list with the password.

4. The voting method according to claim 1, further comprising the step:
the voting machine identifying the person based on the first record in the voter list before casting the vote.

5. The voting method according to claim 1, further comprising the step:
the voting machine generating a fourth record in the voter list when the person has cast the vote.

6. The voting method according to claim 1, further comprising the step:
destroying the voter list or the reference list before evaluating the vote list.

7. The voting method according to claim 1, wherein a group of the voting machines is configured for the person to cast the vote and the voter list and the vote list respectively is synchronized on the voting machines of the group.

8. The voting method according to claim 1, further comprising the step:
the voting machine issuing a machine key and encrypting the second record with the vote in the vote list with the machine key.

9. The voting method according to claim 1, further comprising the steps:
initially collecting the votes that are cast on the voting machine in blocks; and
recording the blocks in the vote list.

10. The voting machine configured to perform the voting method according to claim 1.

11. A voting station including a plurality of voting machines according to claim 10, the voting station comprising:
the monitoring device which monitors the voting machines for alterations and which is monitored by the voting machines for alternations.

12. A software program product adapted to configure a universal computer as the voting machine according to claim 10.

13. The voting method according to claim 1, wherein the voter list, the vote list and the reference list are blockchains.

14. The voting method according to claim 13, wherein the voter list, the vote list and the reference list are three different blockchains that are completely decoupled from each other and have service lives that are different from each other.

15. The voting method according to claim 14, wherein the three different blockchains reference each other.

16. The voting method according to claim 1, wherein the blockchain is a private blockchain.

* * * * *